United States Patent Office 3,373,089
Patented Mar. 12, 1968

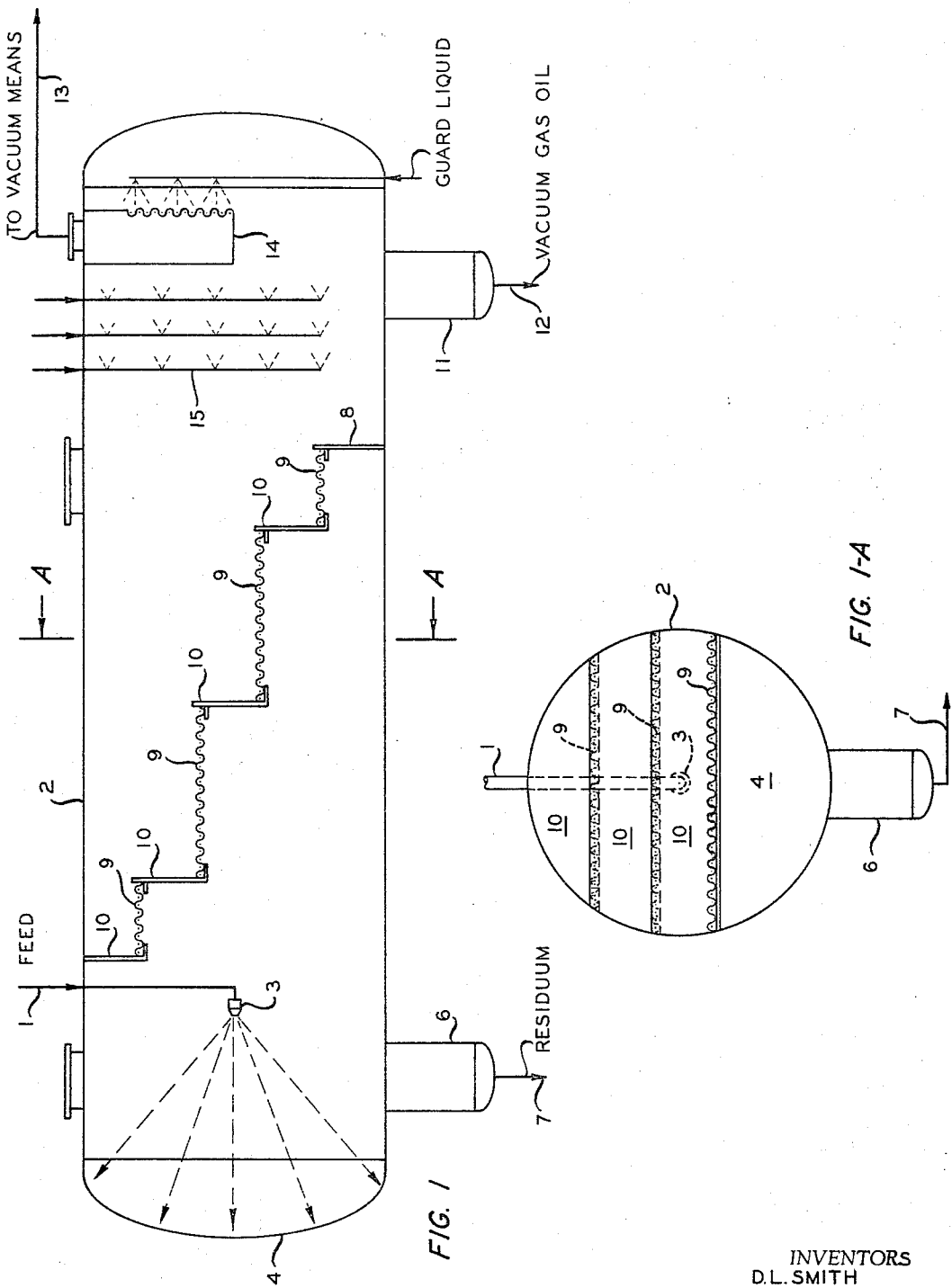

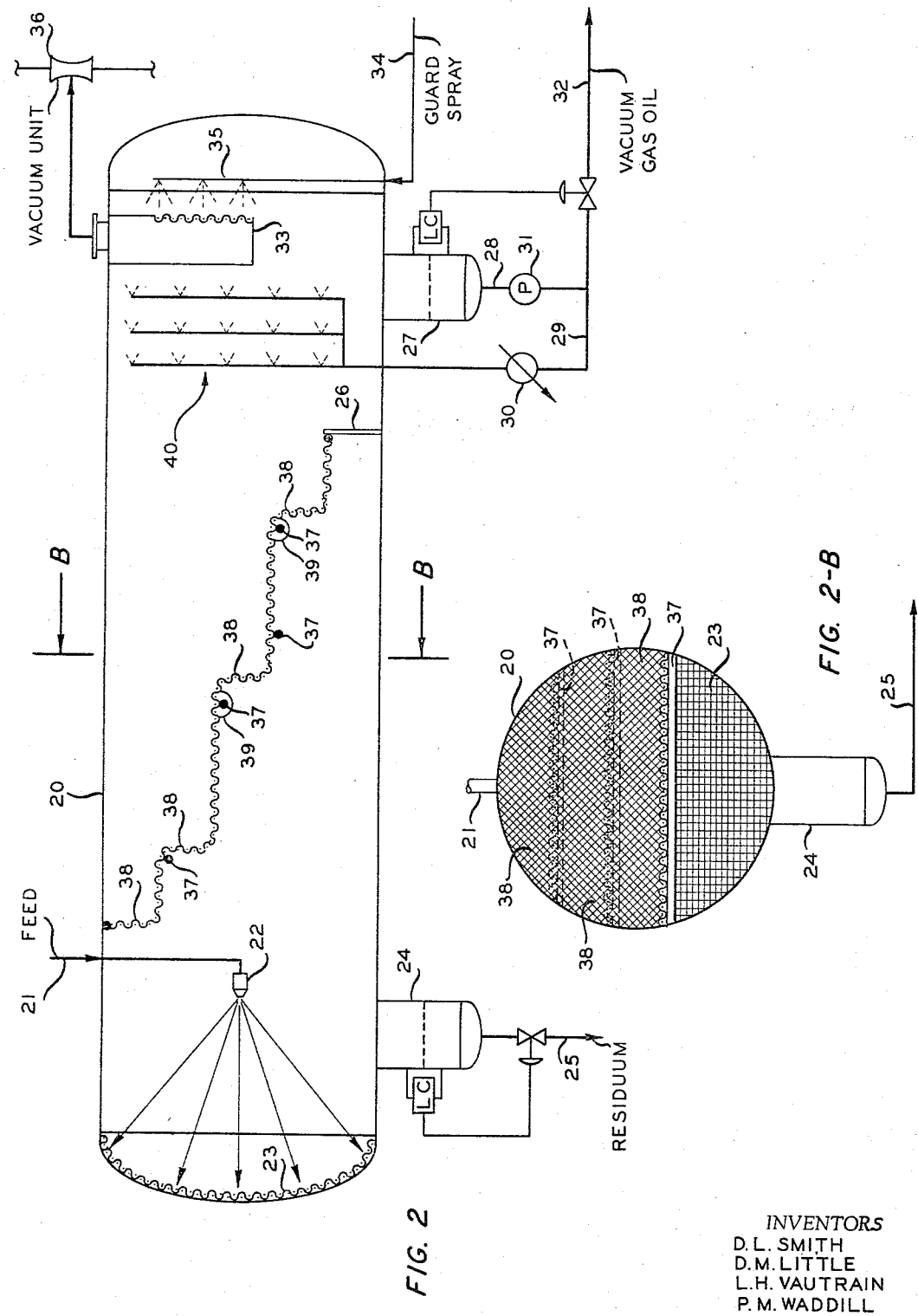

1

3,373,089
HORIZONTAL DISTILLATION VESSEL HAVING DEMISTERS IN DIFFERENT PLANES AND METHOD
Lucien H. Vautrain and Dale L. Smith, Okmulgee, and Paul M. Waddill and Donald M. Little, Bartlesville, Okla., assignors to Phillips Petroleum Company, a corporation of Delaware
Filed July 27, 1964, Ser. No. 385,422
17 Claims. (Cl. 203—40)

ABSTRACT OF THE DISCLOSURE

A distillation vessel adapted for horizontal flow therethrough of vapors is equipped with at least one demister element disposed at a substantial angle to the vertical. In one embodiment the demister is disposed horizontally. In another embodiment the demister section of the vessel contains several demister elements as described. In a further embodiment a stair-step demister arrangement is provided, a specific form of which is accomplished by forming the stair-step arrangement employing a screen extended over progressively lower disposed support bars extending across the vessel. In operation a method for distilling a distillable material by feeding it to one end of a vessel according to the invention causing horizontally travelling vapors momentarily to depart from their horizontal travel, then continuing the horizontal travel of these vapors and recovering vapors and/or condensate from the other end of said distillation vessel.

---

This invention relates to a method of distillation. It also relates to an apparatus in which the distillation of a distillable material can be effected. In one of its aspects, the invention relate sto a method for the distillation of a distillable material wherein vapors generated during the distillation are passed through a distillation zone in a substantially horizontal direction and, while traveling in such a direction, are momentarily passed upward through at least one substantially horizontally extending demister section, preferably through a series of such sections arranged in a stair-step or substantially continuous manner, forming a substantial angle with the vertical. In another of its aspects, the invention relates to an apparatus in which the distillation of a distillable material can be effected and wherein vapors generated are passed substantially horizontally through the apparatus, the apparatus comprising a shell having means at one side to feed a distillable material, a means at another side to remove vapors generated from the distillable material and means arranged intermediate said means for feeding and said means for removing for demisting the vapors while causing the vapors to travel substantially but only momentarily in an upwardly or, as the case may be, in a downwardly direction, the means for effectuating demisting consisting of at least one but preferably more substantially elongated demister pads or sections, forming a demisting means, said means being arranged in a manner to form a substantial angle with the vertical, preferably in stairstep fashion, as later described herein.

The distillation of a distillable material in a manner to form vapors which are conducted substantially in a horizontal direction through a distilling vessel is known. The following patents are among those which relate, in one manner or in another, to the so-called horizontal distillation of distillable materials and illustrate method and/or means for effecting the distillation or flash distillation of distillable material in operations and apparatus wherein at least one step and/or an element is provided to accomplish removal of entrainment or mist of principally unvaporized material from the vapors entraining the same and in a manner so as to cause the least build-up of pressure difference across the vessel or zone. Patent 2,805,981, V. C. Cavin et al., issued Sept. 10, 1957, 2,901,425, Paul M. Waddill, issued Aug. 25, 1959, 2,774,723, G. A. Moyer, issued Dec. 18, 1956, 2,760,918 W. E. Barr, issued Aug. 28, 1956, and 2,799,628, W. E. Barr et al., issued July 16, 1957.

We have now conceived a method and an apparatus wherein, in one embodiment thereof, the vapors which are generally traveling horizontally through the distillation zone or vessel are momentarily caused to pass upwardly through a demister section or pad which is disposed at a large angle with the vertical, preferably in an essentially horizontal manner within the distillation zone or vessel extending along the said vessel for quite some distance to permit demisting with the least amount of interference to the passage of the vapors through the vessel and, therefore, to minimize the pressure drop therein. In the embodiment here considered, a series of horizontally disposed demister pads have been arranged in stair-step fashion so that the pads form at least the tread portion of the "steps." Baffles which can be perforated connect respective ends of the pads or "steps" in a manner to prevent passage of the vapors from one side to the other of the distillation vessel without passing through at least one demister pad. Further, the stair-step arrangement forms an angle with the vertical.

It is an object of this invention to provide a method for distilling a distillable material. It is another object of this invention to provide an apparatus for distilling a distillable material. It is a further object of this invention to provide a method and/or an apparatus for distilling a distillable material wherein a low pressure drop can be maintained all the while suitably and thoroughly removing entrainment from the vapors generated from the distillable material. It is a still further object of the invention to provide for minimum difference in pressure from one end to the other of a horizontal vacuum distillation operation by providing a novel construction permiting a considerably increased cross-sectional area of an entrainment removal or demisting means. It is a further object still to provide a novel arrangement of at least one but preferably of a plurality of demister pads within a horizontally disposed elongated distillation vessel, rendering it especially suitable for vacuum flashing or distillation of distillable materials in the flashing or distillation of which there is unavoidably formed unvaporized residual material which is entrained in the vapors generated.

Other aspects, objects and the several advantages of this invention are apparent from a study of this disclosure, the drawing and the appended claims.

According to the present invention, there is provided a method for the distillation of a distillable material which comprises feeding a distillable material into one side of a distillation zone and removing vapors generated in said zone from another side thereof, thus causing the vapors to travel in a substantially horizontal direction through said zone and in said zone causing said vapors to pass momentarily at an angle to the horizontal, preferably upwardly, through at least one demisting zone extending at a substantial angle to the vertical along the horizontal line of flow of said vapors.

Still according to the invention, there is provided an apparatus for the distillation of a distillable material comprising in combination a shell, said shell having means for feeding a distillable material into said shell at a first locus near one side of said shell, means substantially removed from said locus for removing vapors from said shell from a second locus near the side of said shell, said means for feeding and said means for removing adapting said shell for substantially horizontal vapor flow therethrough, and a structural means forming a substantial angle with the vertical disposed within and forming a permeable partition completely across said shell, intermediate said means for feeding and said means for removing, for demisting vapors flowing through said shell.

In a now preferred embodiment of the invention, in lieu of drawing off vapors which have been demisted or freed substantially from entrained non-vaporized residue from the shell or vessel, these vapors are condensed therein and removed as a condensate, while non-condensables, if any, are, of course, removed from the vessel as a vaporous or gaseous stream.

In the drawing FIGURE 1 illustrates an embodiment of the invention in which a star-step series of baffles and demister pads arrangement is shown. In FIGURE 2, there is shown a modification of the invention in which a demister element or pad is draped across the support rods.

It will be obvious to one skilled in the art that variation and modification are possible in the exception or design of the vessel and to an extent in its operation, it being evident that a concept basic to the vessel in operation, about to be described in more detail, is in the provision within a horizontal distillation of a considerably larger cross-sectional area in which demisting or removal of entrainment can be practiced.

Referring now to FIGURE 1, a distillable material, in this embodiment a topped crude from which last vestiges of heavy gas oil are to be flashed, is passed by way of conduit 1 into horizontally disposed vacuum flashing vessel 2. The topped crude is sprayed by spray means 3 against the left-hand wall 4 of vessel 2. An anti-splash mat may be positioned against wall 4, if desired. Non-vaporized residue is accumulated at keg 6 and removed by pipe 7. A dam 8 is provided to ensure that unvaporized residue will not flow into the clean condensate or far end of the vessel. This dam can be formed as an integral part of the bottom-most baffle of the stair-step arrangement, later described. Vapors generated pass through the stair-step arrangement composed of baffles 10 and demister elements or pads 9 into the right-hand side or far end of the distillation vessel, wherein, if desired, some condensate can be allowed to form and can be removed from keg 11 by pipe 12. There is provided a condensing spray assembly 15 for use in condensing at least a portion of the vapors when this is desired. Ordinarily all condensible vapors will be condensed in the apparatus when it is constructed at its outlet and as now shown. Guard chamber 14, which can be of any conventional structure, insures that substantially no condesibles are lost from the system by way of conduit 13, which conduit communicates with a conventional vacuum producing means, not shown.

Returning now to the stair-step arrangement, the baffles 10, which can be perforate but which, in this embodiment, are plate-like in character and do not permit flow of vapors therethrough, are, in effect, like unto risers of a staircase. These baffles are preferably of a short height and extend vertically only sufficiently to provide the stair-step arrangement and to support the pads at their ends. The pads, however, can be extended and, in the embodiment described, can be and are 4 feet in length, while the baffles are somewhat just over 2 feet in height. It will be understood by one skilled in the art that the baffles and demister pads extend completely across the vessel, as noted in the FIGURE 1A, a cross-sectional view of FIGURE 1. The baffles function in this embodiment to momentarily divert the vapor stream, in subdivided form, upwardly through the several demister pads. There is, thus, a change of the direction of flow and, therefore, of the momentum of the entrained particles within the vapors. It will be noted that in this arrangement the force of gravity constantly drains downwardly accumulated entrainment so that the accumulated entrainment tends to rapidly fall from the demister pads.

Referring now to FIGURE 2, the feed is fed into vessel 20 by feed pipe 21 and spray means 22 which sprays the feed against mat 23. Unvaporized residue is drawn off from keg 24 by pipe 25. A dam 26 is provided at the foot of the demister section, later described. Vapors pass through the demister section and are condensed by cool condensate spray 40, condensate accumulating in keg 27 and being withdrawn therefrom by 28 and being furnished to spray 40 through pipe 29, cooler 30, and pump 31. Condensate is taken to storage through pipe 32. A guard chamber 33, to which a cool oil spray is fed by pipe 34 and spray means 35, is provided to avoid loss of valuable vapors. A vacuum or suction means 36 is schematically illustrated. In this embodiment, substantially all of the vapors are condensed and withdrawn free from entrainment.

Returning to the demister means, there are provided rods 37 extending across the vessel. Retained on these rods is a cascading single demister element 38. Element 38 is fixed and retained to and on the rods by brackets 39.

While the stair-step arrangement of FIGURE 1 is presently preferred due to the simplicity and relatively cheaper and more rapid installation which it permits, FIGURE 2 has been provided for disclosure purposes to illustrate that there can be made within the scope of the several concepts of the invention modifications which embody the feature of providing a considerably extended cross-sectional area through which the vapors can be passed for demisting, thus materially improving the operation without increasing pressure drop across the vessel. In FIGURE 2, the vertical portion of pad 38 can be sealed, if desired, by applying Insulcrete or other cementitious materials. FIGURE 2B is a crosssectional view along B—B of FIGURE 2.

*Specific example*

| | |
|---|---|
| Pressure, mm. Hg absolute: | |
| Flash zone | 2.0 |
| Condensing zone | 1.0 |
| Temperature, ° F.: Flash zone | 700 |
| Topped crude feed (1): | |
| Barrels per day | 1000 |
| API @ 60° F. | 17.0 |
| Temperature, ° F. | 720 |
| Residuum (7): | |
| Barrels per day | 400 |
| Specific gravity | 1.020 |
| Temperature, ° F. | 700 |
| Condensate make (12)[1]: | |
| Barrels per day | 600 |
| API @ 60° F. | 24.0 |
| Temperature, ° F. | 300 |

[1] Does not include spray and guard liquids.

The conditions for the operation of the invention which has been described can be routinely supplied by one skilled in the art. Obviously, details of design and construction have been omitted from the drawings, which serve merely to illustrate the concepts of the invention. The relative sizes and proportions of the vessel and of the stair-step or cascade arrangement of the demister element or pads is well within the scope of one skilled in the art in possession of this disclosure, having studied the same. Presently, if the overall configuration of the stair-step arrangement or its equivalent forms generally an angle of 90° with the vertical, there can be obtained a demisting cross-sectional area which is about 100 percent greater than that of the vertical cross-sectional area of the vessel.

Normally, mesh pads 9 are horizontally disposed in a horizontal vacuum vessel; however, these pads may be up to about 10° from the horizontal and still perform as intended. By using the pads as shown in the drawings, the mesh area in our vessel is substantially double of a vessel wherein the mesh is placed vertically. The ratio of the metal mesh length horizontally to the vessel diameter vertically is about 1.5:1 to 3:1, preferably 2:1. The metal mesh material is any conventional demister material; e.g., Yorkmesh manufactured by Otto H. York Co., Inc., West Orange, N.J. Preferably the demister pads are stair-stepped downwardly in six steps and their lengths in a ten foot diameter vessel horizontally are about two feet, four feet, four feet, four feet, four feet, and two feet, respectively. The baffle material is preferably one-fourth inch thick plate steel.

Reasonable variation and modification are possible within the scope of the foregoing disclosure, the drawing and the appended claims to the invention the essence of which is that there have been provided a method and an apparatus in which horizontally traveling vapors are and can be demisted by passing them through a demisting area or pad which is disposed at a substantial angle to the vertical, thereby providing a larger cross-sectional area for demisting, for example, as in the stair-step arrangement or in the cascade arrangement, substantially as set forth and described herein.

We claim:

1. A horizontal distillation vessel, adapted to distill a distillable liquid or material comprising, in combination, a vessel shell, said shell having means for feeding a distillable material into said shell at a first locus near one side of said shell, means substantially removed from said first locus for removing vapors from said shell from a second locus near the side of said shell, said means for feeding and said means for removing adapting said shell for substantially horizontal vapor flow therethrough, and an elongated structural means forming a substantial angle with the vertical disposed within for a substantial distance along and forming a permeable partition completely across said shell, said partition being composed of several sections, at least one of which is in a plane different from that of another, intermediate said means for feeding and said means for removing, for demisting vapors flowing through said shell.

2. A vessel according to claim 1 wherein said structural means comprises a stair-step arrangement of riser baffles and at least one step tread demister element, said element being disposed longitudinally in said shell and in a substantially horizontal position.

3. A vessel according to claim 2 wherein the high end of the stair-step arrangement is located toward the feed side of the vessel and the low end of said arrangement is located toward the vapor removal side of the vessel.

4. A vessel according to claim 1 wherein the structural means comprises a series of demister elements disposed longitudinally in said shell and in stair-step relation to each other, the first step tread demister element being attached to a depending baffle, the last such element being supported upon an upstanding baffle and wherein a plurality of said demister elements, intermediate said first and said last elements, are attached, proceeding in a direction from said first element, each of them substantially by its farther and lower edge to the nearer and upper edge of the next adjacent element.

5. A method for the distillation of a distillable material which comprises feeding a distillable material into one side of a horizontal distillation zone and removing vapors generated in said zone from another side thereof, causing the vapors to travel in a substantially horizontal direction therethrough, and in said zone while said vapors are traveling therethrough causing said vapors to pass momentarily at a substantial angle to the horizontal through at least one demisting zone having several sections, at least one of which is in a plane different from that of another extending longitudinally at a substantial angle to the vertical along the line of flow of said vapors, then continuing the substantially horizontal flow of said vapors and then removing said vapors from said zone.

6. A method according to claim 5 wherein the vapors are momentarily divided and the streams thus created are passed upwardly each of them through at least one of a series of demisting zones disposed at a substantial angle to the vertical and in stair-step fashion.

7. A method according to claim 6 wherein the series of demister zones is, each of them, substantially horizontally extended or disposed.

8. A vessel according to claim 1 wherein said structural means comprises a demister element draped longitudinally and from the top to the bottom of the vessel across a series of support elements disposed in said vessel in step-wise fashion along the line of flow of vapors, thereby providing said demister element with a cascading-like shape which, viewed along said line of flow of vapors in the overall, forms a substantial angle with the horizontal.

9. A method for the distillation of a distillable material which comprises feeding a distillable material into one side of a horizontal distillation zone and condensing and removing vapors generated in said zone at another side thereof, thus casing the vapors to travel in a substantially horizontal direction through said zone and in said zone while said vapors are traveling therethrough causing said vapors to pass momentarily upwardly through at least one demisting zone having several sections, at least one of which is in a plane different from that of another extending longitudinally at a substantial angle to the vertical along the line of flow of said vapors, then continuing the substantially horizontal flow of said vapors and then removing said vapors from said zone.

10. A horizontal distillation vessel, adapted to distill a distillable liquid or material comprising, in combination, a vessel shell, said shell having means for feeding a distillable material into said shell at a first locus near one side of said shell, means substantially removed from said first locus for condensing vapors and removing condensate from said shell from a second locus near the side of said shell, said means for feeding and said means for removing adapting said shell for substantially horizontal vapor flow therethrough, and an elongated structural means forming a substantial angle with the vertical disposed within and forming a permeable partition completely across said shell, said partition being composed of several sections, at least one of which is in a plane different from that of another, intermediate said means for feeding and said means for condensing, for demisting vapors flowing through said shell.

11. A vessel according to claim 10 wherein said structural means comprises a longitudinally extending stair-step arrangement of riser baffles and at least one step tread demister element, said element being disposed in a substantially horizontal position.

12. A vessel according to claim 11 wherein the high end of the star-step arrangement is located toward the feed side of the vessel and the low end of said arrangement is located toward the vapor removal side of the vessel.

13. A vessel according to claim 10 wherein the structural means comprises a series of demister elements disposed in stair-step relation to each other, the first step tread demister element being attached to a depending baffle, the last such element being supported upon an upstanding baffle and wherein a plurality of said demister elements, intermediate said first and last elements, is attached, each of them, proceeding in the direction from said first element, substantially by its farther and lower edge to the nearer and upper edge of the next adjacent element.

14. A method for the distillation of a distillable material which comprises feeding horizontal distillable material into one side of a distillation zone and condensing and removing vapors generated in said zone at another side thereof, causing the vapors to travel in a substanttially horizontal direction through said zone while said vapors are traveling therethrough and in said zone causing said vapors to pass momentarily at a substantial angle to the horizontal through at least one demisting zone having several sections, at least one of which is in a plane different from that of another extending longitudinally at a substantial angle to the vertical along the line of flow of said vapors, then continuing the substantially horizontal flow of said vapors, then continuing said vapors, and then removing condensed vapors from said zone.

15. A method according to claim 15 wherein the vapors are momentarily divided and the streams thus created are passed upwardly, each of them, through at least one of a series of demisting zones disposed at a substantial angle to the vertical and in stair-step fashion.

16. A method according to claim 15 wherein the series of demister zones is, each of them, substantially horizontally disposed.

17. A vessel according to claim 10 wherein said structural means comprises a demister element draped from the top to the bottom of the vessel across a longitudinally disposed series of support elements disposed in said vessel in step-wise fashion along the line of flow of vapors, thereby providing said demister element with a cascading-like shape which, viewed along said line of flow of vapors, in the overall forms a substantial angle with the horizontal.

References Cited

UNITED STATES PATENTS

| | | | |
|---|---|---|---|
| 1,258,562 | 3/1918 | Harris | 202—200 |
| 1,516,187 | 11/1924 | Hanson | 202—200 |
| 2,760,918 | 8/1956 | Barr | 203—40 X |
| 2,774,723 | 12/1950 | Moyer | 203—88 X |
| 2,901,425 | 8/1959 | Waddill | 203—40 X |
| 2,901,426 | 8/1959 | Waddill et al. | 203—40 X |
| 3,160,571 | 12/1964 | Mulford et al. | 202—173 |
| 3,197,387 | 7/1965 | Lawrance | 202—173 |
| 3,212,232 | 10/1965 | McMinn | 55—19 |
| 2,805,981 | 9/1957 | Cavin et al. | 208—352 |

FOREIGN PATENTS 3,712,368　8/1962　Japan.

NORMAN YUDKOFF, *Primary Examiner.*

F. E. DRUMMOND, *Assistant Examiner.*